United States Patent [19]

McKay et al.

[11] Patent Number: 4,884,635

[45] Date of Patent: Dec. 5, 1989

[54] ENHANCED OIL RECOVERY WITH A MIXTURE OF WATER AND AROMATIC HYDROCARBONS

[75] Inventors: Alexander S. McKay, Las Vegas, Nev.; Declan B. Livesey, Calgary; Philip Harris, Edmonton, both of Canada

[73] Assignee: Texaco Canada Resources, Alberta, Canada

[21] Appl. No.: 235,414

[22] Filed: Aug. 24, 1988

[51] Int. Cl.$^4$ .................. E21B 43/24; E21B 43/26
[52] U.S. Cl. ................................... 166/271; 166/272
[58] Field of Search ............. 166/271, 272, 275, 303

[56] References Cited

U.S. PATENT DOCUMENTS

| | | | |
|---|---|---|---|
| 3,402,770 | 9/1968 | Messenger | 166/272 X |
| 3,593,790 | 7/1971 | Herce | 166/271 X |
| 3,648,771 | 3/1972 | Kelly et al. | 166/272 |
| 3,881,550 | 5/1975 | Barry | 166/266 X |
| 4,071,458 | 1/1978 | Allen | 166/272 X |
| 4,127,170 | 11/1978 | Redford | 166/272 X |
| 4,166,502 | 9/1979 | Hall et al. | 166/272 X |
| 4,753,293 | 6/1988 | Bohn | 166/272 X |

Primary Examiner—George A. Suchfield
Attorney, Agent, or Firm—Jack H. Park; Kenneth R. Priem; Harold J. Delhommer

[57] ABSTRACT

The invention is a method of recovering hydrocarbons from underground hydrocarbon formations penetrated by at least one injection well and at least one production well, which comprises injecting into the formation a mixture of hot water and about 0.1% to about 5% by weight of a hydrocarbon liquid having an aromatic content greater than about 30%. The hot water and hydrocarbon mixtures should be injected at a temperature of at least about 80°C. Hydrocarbons and other fluids are recovered from a production well after a suitable period of time.

6 Claims, 1 Drawing Sheet

ENHANCED OIL RECOVERY WITH A MIXTURE OF WATER AND AROMATIC HYDROCARBONS

This invention concerns a method of recovering hydrocarbons by the injection of hot water and an aromatic hydrocarbon additive. The invention is particularly relevant to the recovery of hydrocarbons from heavy crudes or tar sands.

There are large petroleum deposits in the form of viscous crudes or bitumens. These deposits may be residual hydrocarbon from naturally developed fields or deposits which have never been produced. An example of viscous tar sand deposits occurs in the Athabasca region of Canada. These tars have a gravity of from 6° to 20° API, a clean oil viscosity up to 20,000 cps or more, and an emulsion viscosity of up to 100,000 cps. The asphaltene content of these deposits ranges up to 30% and the sulphur content up to 6%. Because these tars are so viscous, they cannot be recovered by natural techniques and must be mined or stimulated.

Stimulation of these viscous petroleum deposits by steam flooding is a known and tested technique. Various methods have been devised which inject steam, with or without additives such as hydrocarbon solvents and gases. Various pressurization and depletion schemes have also been tried.

A second category of methods to stimulate the production of tar sands has involved the use of various hydrocarbon solvents. The literature discloses the injection of numerous types of hydrocarbons as solvents to lower the viscosity of hydrocarbons and improve tar sand recovery. U. S. Pat. Nos. 3,881,550; 3,945,435; and 3,946,810 disclose a method of injecting high temperature solvent to reduce formation viscosity by demulsifying viscous emulsions of oil-in-water and water-in-oil, and raising the temperature of the crude. The preferred solvent is depentanized naphtha, which contains substantial quantities of aromatics, at a temperature of about 200° to about 650° F. These three patents disclose the addition of hot aromatic solvent along with steam in a mixed or cyclic injection.

U. S. Pat. No. 4,207,945 discloses the injection of a vapor mixture of steam and a petroleum fraction containing naturally occurring phenolic and carboxylic compounds to stimulate and produce heavy oils such as tar sands. Another process is disclosed in U. S. Pat. No. 4,119,149 which comprises flashing a mixture of steam condensate and crude petroleum from a production well for production of a liquid petroleum phase and a vapor phase comprising steam and hydrocarbon vapor, condensing the vapor phase to recover the flashed hydrocarbon as a liquid, and injecting the recovered hydrocarbon with added steam to recover additional heavy oil.

U. S. Pat. No. 4,513,819 discloses the coinjection of steam and a hydrocarbon solvent, wherein the solvent is selected from the group of $C_1$ to $C_{14}$ hydrocarbons, carbon dioxide, naptha, kerosene, natural gasoline, syncrude, light crude oil and mixtures thereof. The amount of coinjected solvent is 2% to 10% of the steam volume. A predetermined amount of steam and solvent mixture is injected. The injection well is shut-in until a certain water cut is produced from a production well, and then the process is repeated for a plurality of cycles.

Unfortunately, in reservoirs containing heavy oils such as the Athabasca Tar Sands, the use of steam and solvents is very costly and in many cases prevents the economic recovery of oil. Although solvents are frequently highly effective, the cost of adding solvent in the amount required often prohibits their use.

Another method of reducing viscosity in the oil reservoirs is by emulsification. Heavy oils and bitumens can be emulsified with water as the external phase. Water-in-oil emulsions are also disclosed in the prior art. U. S. Pat. No., 3,685,581 discloses the use of a continuous phase liquid admixture of hydrocarbon and water under high temperature and pressure in which the oil dissolves water. The patent defines the hydrocarbon as having 6 to 30 carbon atoms but the only example uses LPG and has almost twice as much hydrocarbon as water.

Methods involving hot water and alkaline water for tar sand recovery have engendered numerous references. Examples of hot water alkaline flooding processes can be found in U. S. Pat. Nos. 3,927,716; 4,462,892; and 4,487,262.

SUMMARY OF THE INVENTION

The invention is a method of recovering hydrocarbons from underground hydrocarbon formations penetrated by at least one injection well and at least one production well, which comprises injecting into the formation a mixture of hot water and about 0.1% to about 5% by weight of a hydrocarbon liquid having an aromatic content greater than about 30%. The hot water and hydrocarbon mixtures should be injected at a temperature of at least about 80.C. Hydrocarbons and other fluids are recovered from a production well after a suitable period of time.

DETAILED DESCRIPTION

Figure 1:
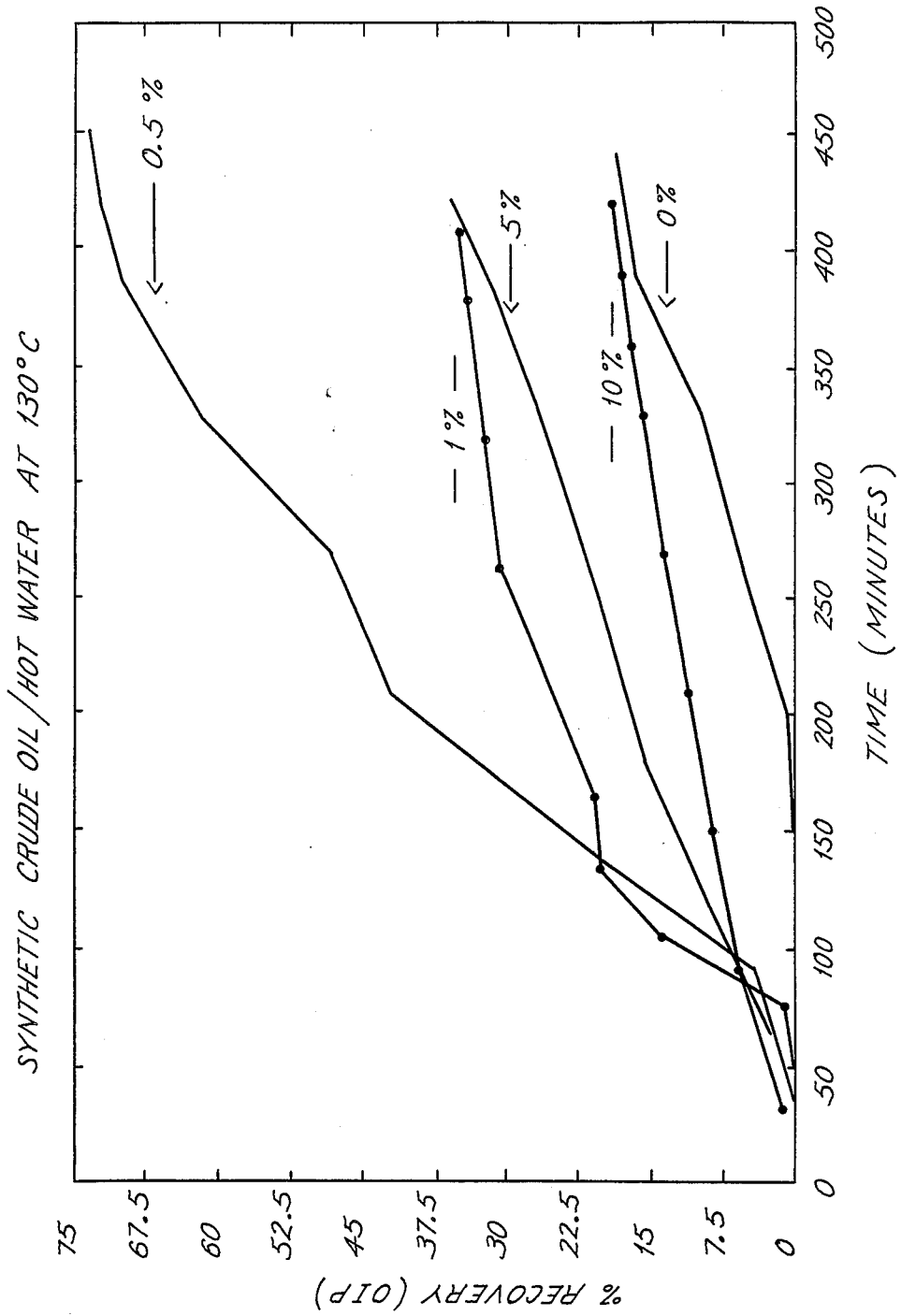
FIG. 1 is a graph illustrating the recovery percentage of oil from core floods for hot water and varying amounts of hydrocarbon additive according to the invention.

It has been discovered that the addition of relatively small amounts of an aromatic hydrocarbon to a hot water flood significantly increases the recovery of bitumen during flooding operations. Hydrocarbons having a relatively high aromatic content form an oil-in-water emulsion which significantly improves recovery efficiency in hot water flooding of viscous oils, particularly tar sands.

The mixture of hot water and hydrocarbon liquid must be injected at a temperature higher than about 80° C., and preferably higher than 120° C. If properly mixed, the resulting emulsion is very efficient in lowering viscosity and sweeping viscous oil through a formation.

The hydrocarbon liquid added to the hot water to form the emulsion should have an aromatic content greater than about 30%. Preferably, the hydrocarbon liquid will have a aromatic content greater than about 40%. Synthetic crudes produced from tar sands by refining offer excellent, inexpensive sources of such hydrocarbon liquids. The synthetic crude produced at the Suncor bitumen refinery near Fort McMurray, Canada has been very effective when added to hot water in the practice of the invention.

Depending upon the formation, it may also be desirable to open a communication path between injection and production wells. Such a communication path may be created by various fracture treatments, solvent injection, drilling or other techniques well known to those skilled in the art.

The following examples will further illustrate the hot water and aromatic hydrocarbon injection method of the present invention. These examples are given by way of illustration and not as limitations on the scope of the invention. Thus, it should be understood that the various details of the invention may be changed to achieve similar results with the scope of the invention.

EXAMPLES 1-5

A series of experiments were performed to test the efficacy of the invention method in tar sand cores. A core of Athabasca tar sand measuring 3 ½ inches in diameter and 12 inches length was placed in a lead sleeve. The core was pressurized to about 300-700 psi in order to simulate the weight of the overlying rocks on the underground reservoir tar sands. A ½' hole was drilled through the center of the core and filled with a clean silica sand sized between 10 and 20 mesh. This was done to simulate the creation of a communication path between injection and production wells in tar sand production. Similarly, the hole through the center of the tar sand core also simulates a high permeability zone, a common occurrence in tar sands.

Varying amounts of an synthetic crude produced from the Suncor bitumen refining facilities near Fort McMurray Canada, were added to hot water at a temperature of 130° C., prior to flowing through the core. The synthetic crude had an aromatic content of about 42% and an API gravity of 35°-40°.

As FIG. 1 illustrates, Example 1 was run with hot water only at 130° C. Recovery efficiency wa about 17% after seven hours when the flood was discontinued.

Examples 2-5 were run with hot water and the 42% aromatic synthetic crude at 130°. Examples 2-5 contained 0.5%, 1%, 5% and 10% by weight of the hydrocarbon additive, respectively. As FIG. 1 indicates, the Example 2 flood with 0.5% of the hydrocarbon additive gave a high recovery of 73% of the oil in place after seven hours. This recovery was much greater than the approximately 35% recovery achieved by the 1% and 5% hydrocarbon additive floods of Examples 3 and 4. When 10% hydrocarbon additive was employed in Example 5, the end result was an insubstantial improvement over the hot water flood without additive.

An optimum concentration of aromatic hydrocarbon additive exists for the recovery of bitumen. This concentration is less than 1% as higher concentrations show an inverse relationship between the amount of hydrocarbon and the recovery efficiency. Two mechanisms can be expected to influence bitumen recovery when aromatic hydrocarbons are added to hot water; viscosity reduction by dilution of the bitumen in the aromatic hydrocarbon, and viscosity reduction by the formation of oil-in-water emulsions. The inverse relationship demonstrated in Examples 1-5 is typical of a recovery mechanism dominated by the creation of oil-in-water emulsions. Not all hydrocarbons are as effective as synthetic crude. To illustrate this point, similar experiments using a naphtha containing 13% aromatics were made which provided a direct relationship between recovery efficiency and the quantity of aromatics added to the hot water. For example, to achieve the same 73% recovery of Example 2 in a solvent hot waterflood, it was necessary to add 7% naphtha by weight to 130° C. hot water.

Many other variations and modifications may be made in the concept described above by those skilled in the art without departing from the concepts of the present invention. Accordingly, it should be clearly understood the concepts disclosed in the description are illustrative only and are not intended as limitations on the scope of the invention.

What is claimed is:

1. A method of recovering hydrocarbons from an underground hydrocarbon formation penetrated by at least one injection well and at least one production well, which comprises:
    injecting into the formation a mixture of hot water and about 0.1% to about 10% by weight of a hydrocarbon liquid having an aromatic content greater than about 30%,
    said hot water and hydrocarbon mixture injected at a temperature higher than about 80° C.; and
    recovering hydrocarbons and other fluids at a production well.

2. The method of claim 1, further comprising opening a communication path through the formation between injection and production wells prior to injecting the mixture of hot water and hydrocarbons.

3. The method of claim 1, wherein the hydrocarbon liquid has an aromatic content greater than about 40%.

4. The method of claim 1, wherein the hot water and hydrocarbon mixture is injected at a temperature higher than about 120° C.

5. The method of claim 1, wherein the mixture of hot water and hydrocarbon liquid comprises about 0.5% hydrocarbon liquid having an aromatic content greater than about 30%.

6. A method of recovering hydrocarbons from an underground hydrocarbon formation penetrated by at least one injection well and at least one production well, which comprises:
    injecting into the formation a mixture of hot water and about 0.1% to about 1.0% by weight of a hydrocarbon liquid having an aromatic content greater than about 40%,
    said water and hydrocarbon mixture being injected at a temperature of at least about 120° C.; and
    recovering hydrocarbons and other fluids at a production well.

* * * * *